Sept. 30, 1947.    J. H. COLLINS, JR., ET AL    2,428,012
TORQUE METER
Filed Aug. 22, 1942
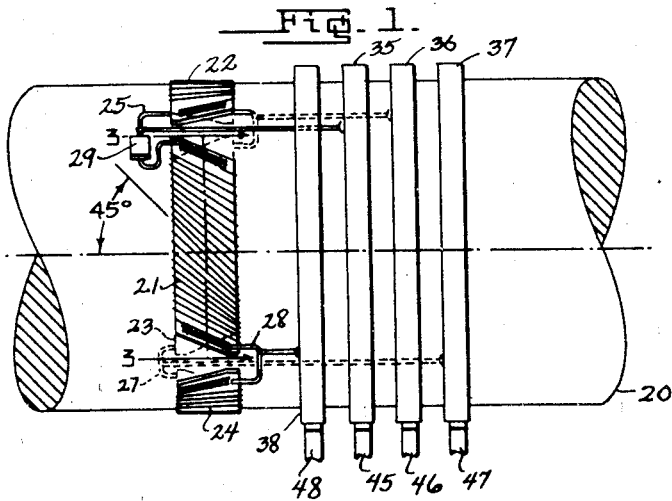
Fig. 1.
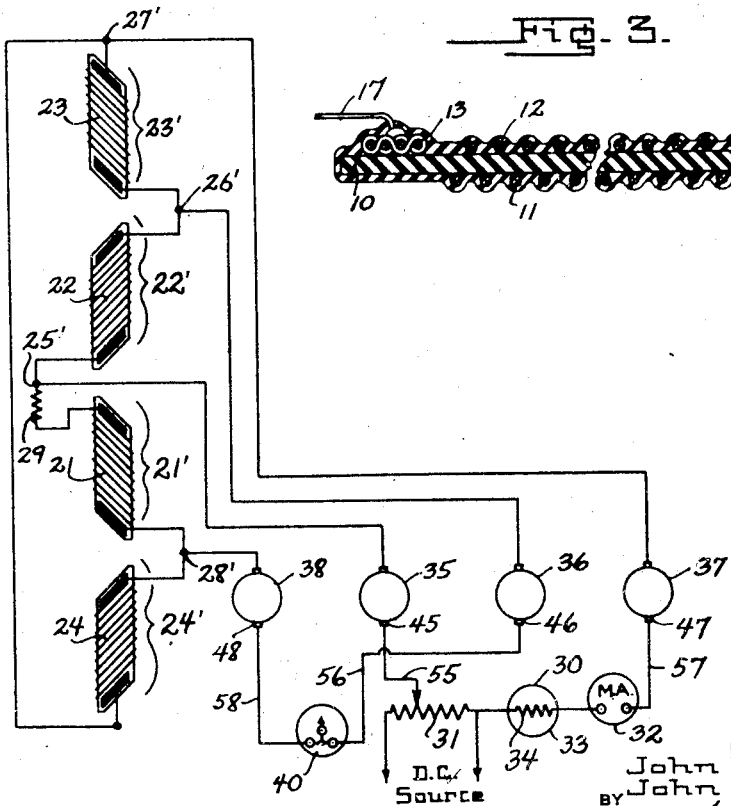
Fig. 2.
Fig. 3.
INVENTORS
John H. Collins, Jr.
BY John C. Nettles
ATTORNEY Patented Sept. 30, 1947

2,428,012

UNITED STATES PATENT OFFICE 2,428,012

TORQUE METER

John H. Collins, Jr., and John C. Nettles,
Hampton, Va.

Application August 22, 1942, Serial No. 455,728

2 Claims. (Cl. 201—63)

(Granted under the act of March 3, 1883, as
amended April 30, 1928; 370 O. G. 757)

This invention relates to a device for continuously measuring the torque of rotary machine parts.

The main object of this invention is to provide a simple and easily operated apparatus for accurately measuring the torque transmitted by a rotary machine part and continuously telemetering the said measurements to an indicating apparatus.

It is a further object of this invention to provide a torque measuring apparatus which is unaffected by temperature variations, thrust, and bending strains whereby the average torque or the vibratory and cyclic changes in torque may be accurately measured.

It is also a further object of this invention to provide a torque measuring device that may be conveniently applied to an exposed portion of a rotating machine part of extremely short axial length.

It is a further and more specific object of this invention to provide a torque meter utilizing a plurality of practically inertialess strain gauges of the resistance-sensitive type which are cemented to a rotary shaft and connected to the bridge circuit on the shaft so that the voltage output will vary directly with vibratory and cyclic changes in the torque transmitted by said shaft, thereby affording means for accurately measuring the average torque or the vibratory and cyclic changes in the torque.

We propose to accomplish the foregoing objects of this invention by utilizing extremely light strain gauges of the resistance-sensitive type which are cemented to the shaft or other rotary machine part in which it is desired to measure stress. The gauges are negligible in weight and practically inertialess thus their response to variations in deformations occurring in the shaft to which they are secured is substantially instantaneous. In construction, each gauge contains a fine high-resistance wire having a diameter of the order of 1/1000 of an inch conveniently mounted on a preformed sheet of insulating paper which can be cemented to the shaft so that the wire will undergo a change in resistance proportional to the strain set up in the wire and hence proportional to the strain occurring in that portion of the shaft directly underneath the said gauge.

The resistance elements of each of the gauges are connected into a bridge circuit so that all of the bridge elements are secured to the shaft, thus minimizing the effects of variations in brush and slip ring contact resistance involved in bringing the circuit from the rotating shaft to remote indicator.

As is well known, a circular shaft when loaded in torsion has a resultant compression and tensile strain in opposite 45° helices. We propose, therefore, to position adjacent gauges on these opposite helices so that the axis of each gauge is at 45° to the axis of the shaft or rotary machine part and at right angles to each other. Thus, adjacent gauges measure strain in the principal directions of the tension and compression of a shaft subjected to pure torsional stress.

In the preferred modification of our invention, the gauges are of equal size so that each overlies substantially equal axial and peripheral portions of the shaft and the gauges are dimensioned relative to the diameter of the shaft so as to jointly completely encircle the said shaft. When diametrically opposite gauges are connected to form the diagonally opposite arms of the bridge, the resistance in the adjacent arms forming one branch of the bridge will be increased and decreased respectively and in the same ratio with a change in the torque transmitted by said shaft. Whether the resistance be decreased or increased by an increase in torque depends upon whether the gauge is positioned along the compressional or tensile axis. It should be obvious also that upon a decrease in torque, the resistance of the gauge mounted along the tensile axis decreases whereas the resistance of the gauge mounted along the compressional axis increases. Thus, the resistance in one of the gauges forming one of the adjacent arms of the bridge is increased in proportion to an increase in torque whereas the resistance of the gauge forming the other adjacent arm is decreased in the same ratio to cause the voltage output of the bridge to vary proportionally with the torque. The sensitivity of the instrument is increased two-fold from that which could be obtained by utilizing a single resistance element or a plurality of resistance elements each of which lie along the same compressional or tensile axis. By utilizing four gauge elements, the sensitivity may be increased four-fold.

Assuming that the shaft is fixed in position and subjected to a bending moment and that diametrically opposed gauges located at the top and bottom of the shaft are subjected respectively to compression and tension. Thus, the resistance in the diametrically opposed gauges will be increased and decreased respectively and in the same ratio. The laterally and diametrically opposed gauges are each bisected by the neutral axis of the shaft so that each half is subjected to a strain equal in value but of opposite sign with a total effective change in resistance equal to zero. The top and bottom diametrically opposed gauges are connected to form the diagonally opposite arms of the bridge so that if the resistance of one is increased and the resistance of the other is decreased in the same ratio, the overall effect on the balance of the bridge will be zero. The circuit is thus unaffected by bending strains. Likewise, changes in thrust effect resistance elements of all of the gauges equally with the result that the output voltage of the bridge will not change with changes in thrust. Changes in temperature also have little effect upon the output voltage of the bridge since all of the gauges are positioned close together on the same section of the shaft where each is subjected to substantially the same temperature. The device is thus substantially insensitive of temperature.

A number of advantages of this invention are attributable to the use of a Wheatstone bridge in which the adjacent resistance elements are completely mounted on the rotary machine part and positioned to respond respectively to changes in compression and tension. A list of some of the advantages follows:

1. The sensitivity over use of a single gauge is increased by the multiple of four.
2. The measuring circuit is substantially unaffected by variations in the slip ring and brush contact resistance.
3. The gauges may be positioned so as to balance out errors due to the presence of a bending moment.
4. The instrument will be substantially insensitive to variations in temperature and axial thrust.
5. The indicating instrument utilized with the Wheatstone bridge may be calibrated linearly to read in foot pounds torque.
6. The torque meter requires only a limited axial expanse of shaft for installation thereby rendering it unnecessary to modify the machine part or the shafting. It is this feature of our invention which makes it especially well suited for measuring the torque output of airplane engines in flight.

Other advantages of this invention reside in the fact that a light weight inertialess gauge induces no inertia limitations in the measurement of high frequency changes in torque. By utilizing the particular strain gauge hereinafter specifically described, the gauge may be secured to the rotary machine part so that no slippage will occur between the gauge and rotating machine part even at temperatures as high as 350° Fahrenheit.

Other objects and advantages of this invention will become apparent from the specification wherein the specific features of a preferred modification are described in detail in connection with the accompanying drawings, in which:

Fig. 1 is an elevational view of a rotary shafting showing the strain gauge mounted thereon and the electrical connections thereto;

Fig. 2 is a schematic wiring diagram of the torque meter showing the Wheatstone bridge circuit; and Fig. 3 is a greatly enlarged cross-sectional view showing the parts of the strain gauge, the section being taken substantially at 3—3 of Fig. 1.

Referring now to the drawings and particularly to Fig. 3 illustrating the structure of the strain gauge per se, the body portion of which is indicated generally at 10. This body portion 10 is formed of electrically insulated paper of a commercial grade having a thickness of the order of one hundredth of an inch. The configuration of the insulating body 10 is preferably that of a 45°–135° parallelogram. The gauge is placed on the shaft so that its longer parallel sides are at right angles to the axis of the shaft. When in this position, the gauge illustrated is 9/16 of an inch in length and 2 inches wide, the length, of course, being that dimension parallel to the axis of the shaft. It is thus apparent that less than one inch of exposed shaft length provides sufficient space for the gauge portion of the torque meter. It should also be apparent that the configurations of the insulated body member facilitate positioning the gauge members on the shaft so that their axes will lie along opposite 45° helices. This may be accomplished by maintaining the parallel sides of the insulated body member at right angles to the axis of the shaft. In constructing the gauge, the wire 12 is wound about the body portion 10 so that the coil sides thereof will lie parallel to the short sides of the body portion 10. The ends of the coiled wire are soft soldered to fine strips of copper screening 13 and 14 to which the external leads 17 and 18 are also soldered. The entire gauge is then thoroughly coated with a phenolic resin 11 which is thinned with acetone to a brushing consistency. After the application of the phenolic resin, the gauges are placed in a temperature-controlled oven and baked for approximately two hours at 150° F. and three hours at 250° F. After the baking process, the units are ready for use and may be attached to the shaft by coating the shaft with a phenolic resinous cement and repeating the baking schedule. Acetone thin Bakelite may be used as a cement and when applied in the manner described above produces a sufficiently strong bond between the gauge and shaft or other rotary machine part so that there is no evidence of slippage or creepage between the gauge and the shaft even at temperatures as high as 350° F.

The most important feature of the torque meter of our invention is the strain-sensitive network that results from the arrangement of the gauges around the power shaft 20 illustrated in Fig. 1. As shown, four gauge elements, indicated on the drawings at 21, 22, 23, and 24, are cemented so as to completely encircle the said shaft and to substantially cover the entire peripheral surface for an axial length equal to the length of the gauge in its dimension parallel to the axis of the shaft. Each of the gauges alternate in position peripherally of the shaft with the axes of the adjacent gauges intersecting at right angles and each forming an angle of 45° with respect to the axis of the power shaft. Thus, the resistance of the wire 12 in alternate gauges will be proportional to the same type of strain, either compressional or tensile, depending upon the position of the gauge relative to the direction of rotation of the shaft. Electrically conductive junctions 25, 26, 27 and 28 connect the high-resistance coils of gauges 21—22, 22—23, 23—24, and 24—21, respectively in a loop series circuit. The junction 26 and 28 are connected respectively to the slip rings 36 and 38 and the junctions 25 and 27 are connected respectively to the slip rings 35 and 37. An adjustable resistance 29 is connected in series with the junction 25 so as to provide a means for balancing the bridge network.

In Fig. 2, we have shown schematically a developed view of an electric circuit for connecting the gauge elements in a Wheatstone bridge network. Electrical energy is supplied to the bridge circuit through the brushes 45 and 47 which bear respectively on the slip rings 35 and 37. In the modification illustrated, the power is supplied through a suitable potentiometer which is connected across a D. C. source. The conductive lead 55 extending from the brush 45 is connected to an adjustable contact arm of the potentiometer 31 to provide means for varying the voltage impressed to the diagonally opposite bridge corners 25' and 27'. The lead 51 connects the brush 41 to the other end of the potentiometer through the milliampere 32 and the current regulator tube 33.

This regulator tube 33 is of the standard commercial type and is used in the circuit to absorb variations occurring in the supply voltage to maintain a substantially constant current magnitude in said circuit. This is accomplished by the variable resistance characteristics of the filament 34 which changes rapidly with temperature variations and thus tends to keep the current flowing through the tube constant regardless of supply voltage fluctuations. The tube, per se, consists of a filament 34 mounted in a glass envelope 30 which contains a low pressure gas serving to conduct heat from the filament to the envelope and hence to the surrounding air. Within the operating current range, the tube 33 has an essentially flat current-voltage characteristic so that comparatively large variations in voltage produce very small current changes. By placing the tube in series with the power supply circuit of the bridge, the current to the bridge and consequently the voltage across the bridge is held substantially constant for static conditions of torque transmission. This condition will prevail notwithstanding changes in the external supply of voltage or in the contact resistance of the brush and slip ring. The tube 33 is not absolutely essential to our invention and could be eliminated in favor of some other means for maintaining a constant current input in the bridge.

The energy for operating the galvanometer 40 or other indicating or recording instruments, such as an oscilloscope, is conducted through a pair of slip rings 36 and 38 to the brushes 46 and 48 and by means of the conductive leads 56 and 58 in series with the galvanometer 40. The resistance of the bridge circuit is maintained relatively high so that the current will be in the order of a few micro amperes. Thus, slight variations in slip ring resistance will not materially affect the accuracy of the measurements.

Consider, for example, that the shaft 20 of Fig. 1 is rotating in a clockwise direction when viewed from the left. On an increase in applied torque, the unbalance of the Wheatstone bridge will be changed since the resistance in the diagonally opposed arms 21' and 23' will be increased whereas the resistance in the diagonally opposed arms 22' and 24' will be decreased. The voltage appearing across the diagonally opposed corners 26' and 28' will be a function of the torsional strain set up in the shaft 20.

If the bridge is originally balanced when no torque is being transmitted by the shaft 20, the polarity of this output voltage appearing across the output diagonals of the bridge will change with change in direction of rotation of the shaft, thus, the voltage will not only be indicative of the magnitude of the torque but also will indicate the sense. Furthermore, if the increase in resistance of the gauge connected to form one arm of a branch circuit of a bridge varies equally but oppositely with the resistance connected to form the other arm of the branch of the bridge, the voltage appearing across the diagonally opposite corners 26' and 28' will be a linear function of the torque and the galvanometer 40 may be linearly calibrated to read foot-pound torque.

According to the provisions of the patent statutes, the preferred form of our invention has been illustrated and described, with the understanding, however, that certain modifications may be made without departing from the invention and that the invention may be practiced otherwise than specifically illustrated and described and still remain within the scope of the appended claims.

The invention described herein may be manufactured and used by or for the Government of the United States of America for governmental purposes without the payment of any royalties thereon or therefor.

We claim:

1. Apparatus for measuring the torque transmitted by a circular power shaft, comprising a strain gauge adapted to be secured thereto, said strain gauge comprising an insulating body member formed of a thin dielectric material having the configuration of a parallelogram having diagonally opposed internal angles each equal to 45°, a coil of high resistance wire disposed about said body member, the coil sides thereof being parallel to the sides of said body member, and an insulating material covering said body member, whereby said gauge may be accurately located on the curved surface of said shaft at an angle of 45° merely by maintaining the sides of said body member perpendicular to the axis of said shaft.

2. A strain gauge adapted to be secured to a circular power shaft for use in measuring the torque transmitted by said shaft, said strain gauge comprising, an insulating body member of sheet material having the configuration of a parallelogram including diagonally opposed internal angles each equal to 45°, and a coil of resistance wire disposed about said body member, the coil sides thereof being parallel to the sides of said body member, whereby said gauge may be accurately located on the curved surface of said shaft at an angle of 45° by maintaining the sides of said body member perpendicular to the axis of said shaft.

JOHN H. COLLINS, Jr.
JOHN C. NETTLES.

REFERENCES CITED

The following references are of record in the file of this patent:

UNITED STATES PATENTS

| Number | Name | Date |
| --- | --- | --- |
| 2,073,394 | MacMillan | Mar. 9, 1937 |
| 2,217,539 | DeBruin | Oct. 8, 1940 |
| 1,738,044 | Giovanni | Dec. 3, 1929 |
| 2,019,999 | Schellenger | Nov. 5, 1935 |
| 2,252,464 | Kearns Jr., et al. | Aug. 12, 1941 |
| 2,292,549 | Simmons, Jr. | Aug. 11, 1942 |
| 1,665,822 | Shimizu | Apr. 10, 1928 |
| 2,316,975 | Ruge | Apr. 20, 1943 |
| 2,322,319 | Ruge | June 22, 1943 |
| 2,359,125 | Langer et al. | Sept. 26, 1944 |
| 2,392,293 | Ruge | Jan. 1, 1946 |

FOREIGN PATENTS

| Number | Country | Date |
| --- | --- | --- |
| 704,327 | France | Feb. 17, 1931 |
| 549,140 | Great Britain | Nov. 9, 1942 |

OTHER REFERENCES

A. V. de Forest et al., "The Development of Strain Gages"; Technical Notes, National Advisory Committee for Aeronautics, No. 744. Published in Washington, D. C., January, 1940; pages 1–35. (Copy in 265–1.)